United States Patent
Castellano

[15] 3,703,329
[45] Nov. 21, 1972

[54] LIQUID CRYSTAL COLOR DISPLAY
[72] Inventor: Joseph Anthony Castellano, New Brunswick, N.J.
[73] Assignee: RCA Corporation
[22] Filed: Dec. 29, 1969
[21] Appl. No.: 888,603

[52] U.S. Cl. ............350/150, 350/158, 350/160 LC
[51] Int. Cl. .................................................G02f 1/26
[58] Field of Search......350/150, 155, 160, 157, 158, 350/160 LC; 356/71; 352/408

[56] References Cited

UNITED STATES PATENTS

| 3,440,620 | 4/1969 | French | 356/71 |
| 2,400,877 | 5/1946 | Dreyer | 350/155 |
| 3,551,026 | 12/1970 | Heilmeier | 350/157 |

OTHER PUBLICATIONS

White, Modern College Physics, Van Nostrand, N.J., 1962, page 345, paragraph 42.7.

Primary Examiner—David Schonberg
Assistant Examiner—Michael J. Tokar
Attorney—Glenn H. Bruestle

[57] ABSTRACT

A color display system capable of producing essentially all the colors of the visible spectrum comprises three cells each including a solution consisting of a pleochroic dye in a nematic liquid crystal composition. Each of the solutions can change its transmission of polarized white light in response to an electric field so as to change the color appearance of the solution. One solution of the system can change in appearance from colorless to magenta, another from colorless to cyan, and a third from colorless to yellow. The system includes means for applying an electric field separately to each of the solutions and means for passing polarized white light successively through each solution.

8 Claims, 2 Drawing Figures

INVENTOR
Joseph A. Castellano
BY
ATTORNEY

LIQUID CRYSTAL COLOR DISPLAY

BACKGROUND OF THE INVENTION

The invention described herein was made in the performance of work done under a NASA Contract and is subject to the provisions of Section 305 of the National Aeronautics and Space Act of 1958, public law 85–568 (72 STAT. 435; 42 U.S.C. 2457).

This invention relates to a color display and particularly to a color display comprising layers of nematic liquid crystals containing pleochroic dyes therein.

Nematic liquid crystal light valves and display devices and nematic liquid crystal compositions useful therein are described in U.S. Pat. No. 3,222,485, issued to Richard Williams. Such light valves are controlled by an electric field and operate when the liquid crystal composition is in its mesomorphic state. Generally, with no electric field applied to a thin layer of the nematic liquid crystal composition, the composition transmits a particular quantity of light without scattering of the light. When an electric field above a threshold value is applied to the liquid crystal layer, which value depends upon the particular liquid crystal composition, the layer appears to change in the intensity of transmitted light in the region of the applied field. This apparent change in light intensity is actually due to a change in the light scattering properties of the liquid crystal upon alignment of the liquid crystal molecules in the electric field.

The electro-optical effect due to alignment of the nematic liquid crystal molecules in an electric field may be employed in transmissive, reflective or absorptive type flat-panel displays and light shutters or for other applications.

Liquid crystal displays and light modulators which include a pleochroic dye in the liquid crystal composition are also known. In these devices alignment of the liquid crystal molecules causes alignment of the pleochroic dye dissolved therein. Since the observable color of the pleochroic dye differs depending upon the direction of the alignment of the pleochroic dye molecules (or upon alignment of the dye molecules as opposed to a non-aligned pleochroic dye), alignment of the dye in the liquid crystal composition alters the observed color of the device.

In order to make a color display system capable of displaying substantially the entire visible spectrum, I found that particular combinations of pleochroic dyes in a nematic liquid crystal are necessary. Prior to my discovery, the necessary combinations of pleochroic dyes dissolved in nematic liquid crystal compositions which could be used for such a broad spectrum color display were not known.

SUMMARY OF THE INVENTION

A liquid crystal color display system comprises a plurality of cells. Each of the cells contains a liquid crystal composition and a pleochroic dye composition. The pleochroic dye composition of the various cells are different from each other. In addition, each cell is separately controllable by means of an electric field applied thereto. The system employs polarized white light.

DESCRIPTION OF THE PREFERRED EMBODIMENTS

Figure 1:
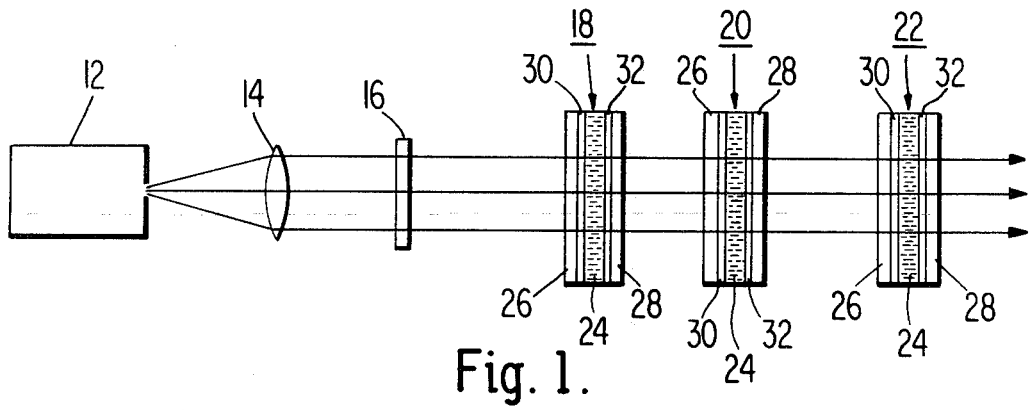
FIG. 1 is an elevational view of a multi-cell liquid crystal system embodying the invention.

Referring to FIG. 1, there is shown a source of white light 12 which is preferably (but not necessarily) collimated by means of a collimating lens 14. The collimated white light then passes through a polarizer 16 and thence in tandem through three liquid crystal electro-optical cells 18, 20 and 22 respectively. Each liquid crystal cell comprises a solution 24 of a pleochroic dye dissolved in a nematic liquid crystal composition which aligns in an electric field. The solution 24 is contained between transparent support plates 26 and 28 having transparent conductive coatings 30 and 32 respectively on the inner surfaces thereof. In operation, each of the conductive coatings is connected to a voltage source (not shown) so as to separately control and vary the electric field applied across the liquid crystal solutions of each liquid crystal cell. In this way the degree of alignment of each of the pleochroic dyes can be separately controlled. The specific pleochroic dye composition in each of the three solutions is different from that of the others.

In order to obtain a system which is capable of transmitting substantially all the colors of the visible spectrum, the individual cells should comprise solutions which are capable of absorbing different portions of the spectrum. More particularly, the individual liquid crystal cells should be able to be varied in appearance from their unswitched or non-aligned state to their fully switched or fully aligned state as follows:

one cell from cyan to colorless;
one cell from magenta to colorless; and
one cell from yellow to colorless.

In operation, by varying the electric field of each cell from between zero to that which is necessary to produce maximum alignment of the dye molecules, one can obtain substantially every color in the visible spectrum, including black and white, when starting with polarized white light which passes in tandem through all three cells.

Although only one color at a time will be transmitted by the system shown, a full color display system can be made by, for example, providing each device with conductors in the form of a cross-grid array as shown for example in the cited Williams patent. In such a system the color at any display element in the array can be separately controlled by controlling the applied field at each element of each of the cells thereby providing a full color display system.

Figure 2:
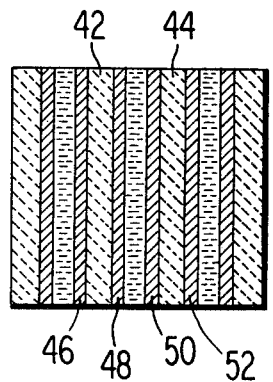
FIG. 2 is a cross-sectional elevational view of a liquid crystal structure useful in a compact system.

In addition the system may be made more compact and the number of glass surfaces from which reflective losses may occur may be reduced by providing a structure as shown in FIG. 2 wherein two inner support plates 42 and 44 each help support two solutions and electrodes therefor at the same time. In this instance, both sides of each of the inner support plates 42 and 44 are provided with transparent conductive coatings, 46 and 48 on plate 42 and 50 and 52 on plate 44.

Typically, the solutions consist of a nematic liquid crystal host material of the type which aligns in response to an electric field, into which is dissolved from about 0.5 to 5 weight percent of a pleochroic dye. A preferred dye concentration is from 1–2 percent.

Examples of preferred nematic liquid crystal compounds useful as host materials in the solutions of the system include alkoxybenzylidene anils and acyloxybenzylidene anils such as those having the structural formula

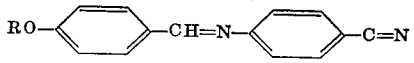

wherein OR is an alkoxy radical preferably having from one to seven carbon atoms or an acyloxy radical having from two to seven carbon atoms.

Actually, mixtures of the nematic compounds are preferred. This is due to the fact that the temperature at which the mixture changes from a solid crystalline state to the nematic mesomorphic state, and hence, the temperature of operation of the solution, is lower in the case of mixtures than for the individual compounds within a given mixture.

In order to obtain the color changes necessary for a broad color response, that is, to obtain solutions which switch from colorless to cyan, magenta and yellow, the following dyes are suitable:

| Name and structure | Color change due to alignment |
|---|---|
| N,N'-dimethylindigo | Colorless to cyan. |
| N,N'-dipalmitoylindigo | Colorless to magenta. |
| p-Nitrobenzylidene-phenylhydrazone | Colorless to yellow. |
| Derivative* of oil yellow (an azo dye) | Colorless to yellow. |

*The derivative of the azo dye is used so as to increase the solubility of the dye in the liquid crystal composition.

It should be pointed out that the preferred pleochroic dyes are non-ionic in the nematic liquid crystal solution.

The specific solutions employed in the preferred system consist of:

a. cyan to colorless;
0.65 wt. percent indophenol blue

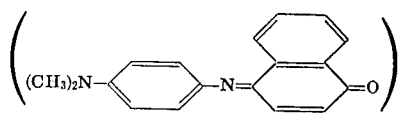

and 0.35 wt. percent 4-butoxybenzylidene-4'-amino-4''-nitroazobenzene

dissolved in an equimolar nematic solution of p-hexoxybenzylidene-p'-aminobenzonitrile, p-hexoylbenzylidene-p'-aminobenzonitrile, and p-heptoylbenzylidene-p'-aminobenzonitrile.

b. magenta to colorless;
1 wt. percent of 2-amino-8-hydroxy-1-azonaphthyl-4' benzonitrile

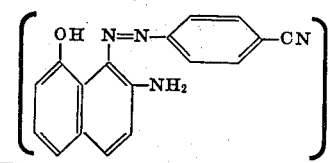

dissolved in the same equimolar nematic solution as recited in (a) above.

c. yellow to colorless;
1.5 wt. percent of 4-butoxybenzylidene-4'-amino-4''-nitroazobenzene dissolved in the same equimolar nematic solution as recited in (a) above.

I claim:

1. A color display system comprising three cells arranged in tandem, each cell containing a solution comprising a pleochroic dye dissolved in a nematic liquid crystal composition, each of said solutions having the characteristic of changing in color in response to an electric field when polarized white light is passed therethrough, wherein
   a. said pleochroic dye of said first cell consists of a mixture of indophenol blue and 4-butoxybenzylidene-4'-amino-4''-nitroazobenzene,
   b. said pleochroic dye of said second cell consists of 2-amino-8-hydroxy-1-azonaphthyl-[p] 4'-benzonitrile,
   c. said pleochroic dye of said third cell consists of 4-butoxybenzylidene-4'-amino-4''-nitroazobenzene, and
   d. electrode means for varying the color of each of said cells when polarized white light is passed therethrough.

2. The color display system recited in claim 1 wherein the total concentration of dye in said nematic liquid crystal composition of each of said cells is between 1 and 2 weight percent.

3. The color display system recited in claim 1 wherein the nematic liquid crystal composition of each of said cells comprises at least one member of the group consisting of alkoxybenzylidene anils and acyloxybenzylidine anils wherein the alkoxy radical has from one to seven carbon atoms and wherein said acyloxy radical has from two to seven carbon atoms.

4. The color display system recited in claim 1 wherein the nematic liquid crystal composition of each cell comprises a mixture consisting essentially of p-hexoxybenzylidene-p'-aminobenzonitrile, p-hexanoylbenzylidene-p'-aminobenzonitrile, and p-heptanoylbenzylidene-p'-aminobenzonitrile.

5. A color display system comprising three cells arranged in tandem, each cell containing a solution comprising a pleochroic dye dissolved in a nematic liquid crystal composition, each of said solutions having the characteristic of changing in color in response to an electric field when polarized white light is passed therethrough,
  a. said pleochroic dye of said first cell is selected from the group consisting of a mixture of indophenol blue and 4-butoxybenzylidene-4'-amino-4''-nitroazobenzene and of N,N'-dimethyl-indigo,
  b. said pleochroic dye of said second cell is selected from the group consisting of 2-amino-8-hydroxy-1-azonaphthyl-4'-benzonitrile and N,N'-dipalmitoylindigo,
  c. said pleochroic dye of said third cell is selected from the group consisting of 4-butoxybenzylidene-4'-amino-4''-nitroazobenzene and p-nitrobenzylidenephenylhydrazone, and
  d. electrode means for varying the color of each of said cells when polarized white light is passed therethrough.

6. The color display system recited in claim 5 wherein the concentration of pleochroic dye in said nematic liquid crystal composition is from 1-5 percent by weight.

7. The color display system recited in claim 5 wherein the nematic liquid crystal composition of each of said cells comprises at least one member of the group consisting of alkoxybenzylidene anils and acyloxybenzylidene anils wherein the alkoxy radical has from one to seven carbon atoms and wherein said acyloxy radical has from two to seven carbon atoms.

8. The color display system recited in claim 5 wherein the nematic liquid crystal composition of each cell consists essentially of a mixture of p-hexoxybenzylidene-p'-aminobenzonitrile, p-hexanoylbenzylidene-p'-aminobenzonitrile and p-heptanoylben-zylidene-p'-aminobenzonitrile.

* * * * *